United States Patent
Carpenter et al.

(10) Patent No.: US 7,349,342 B2
(45) Date of Patent: Mar. 25, 2008

(54) TRAFFIC METERING IN DATA NETWORKS

(75) Inventors: Brian E. Carpenter, Kilchberg (CH); Clark D. Jeffries, Durham, NC (US); Andreas Kind, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 1009 days.

(21) Appl. No.: 10/390,385

(22) Filed: Mar. 17, 2003

(65) Prior Publication Data

US 2004/0184404 A1    Sep. 23, 2004

(51) Int. Cl.
  *G01R 31/08* (2006.01)
  *H04L 1/00* (2006.01)
(52) U.S. Cl. ................................. 370/235.1
(58) Field of Classification Search ........... 370/465, 370/468, 236
  See application file for complete search history.

(56) References Cited

U.S. PATENT DOCUMENTS

| | | | | |
|---|---|---|---|---|
| 6,147,970 A | * | 11/2000 | Troxel | 370/235 |
| 6,748,435 B1 | * | 6/2004 | Wang et al. | 709/225 |
| 6,901,050 B1 | * | 5/2005 | Acharya | 370/230.1 |
| 6,950,395 B1 | * | 9/2005 | Bashandy et al. | 370/230.1 |
| 6,965,566 B2 | * | 11/2005 | Kawasaki et al. | 370/235 |
| 7,002,980 B1 | * | 2/2006 | Brewer et al. | 370/414 |
| 7,020,143 B2 | * | 3/2006 | Zdan | 370/395.21 |
| 7,149,184 B2 | * | 12/2006 | Takada et al. | 370/230 |

* cited by examiner

*Primary Examiner*—Kevin C. Harper
(74) *Attorney, Agent, or Firm*—Joscelyn G. Cockburn

(57) ABSTRACT

Methods and apparatus are provided for metering data packets having a plurality of different packet lengths in a data communications network. A token count $T_C$ is incremented at a token increment rate CIR subject to an upper limit CBS on the token count. On arrival of a packet of length L tokens, it is determined if both $T_C > 0$ and $T_C + n \geq L$, where n is a defined number of tokens. If so, the data packet is categorized as in profile and L tokens are subtracted from the token count $T_C$. Otherwise the data packet is categorized out of profile. In some embodiments, n is set to a value in the range $0 < n < (L_{max} - 1)$ where $L_{max}$ is the maximum length of data packets to be metered. In other embodiments, n is varied in the range $0 \leq n \leq (L_{max} - 1)$ in dependence on at least one feedback signal indicating an operational condition in the network. The degree of conformance of the metering system is determined by the parameter n, whereby the conformance level can be tuned to particular multi-length packet environments.

12 Claims, 7 Drawing Sheets

UDP Traffic with n = 1000B

TCP Traffic with n = 0B

TCP Traffic with n = 500B

TCP Traffic with n = 1000B

TRAFFIC METERING IN DATA NETWORKS

TECHNICAL FIELD

This invention relates generally to traffic metering in devices in data communications networks.

BACKGROUND OF THE INVENTION

Traffic metering is the process of measuring temporal properties, such as rate, delay, jitter, etc., of a stream of data packets processed by a network device. The result of a metering process may be qualitative or quantitative. With quantitative metering, one or more measured property values are returned by the meter. With qualitative metering, measured values are effectively compared with a traffic profile defined in terms of property thresholds to determine, on a packet-by-packet basis, whether or not the traffic is within the profile. If the traffic is within the profile when a given packet is processed by the meter, i.e. the (or each) measured property value is below the appropriate threshold, then the packet is categorized as in profile, or "IN" for short. Otherwise the packet is categorized as out of profile, or "OUT" for short. Metering is usually combined with marking of data packets. Marking is the process of setting information in the packet, typically header information, according to the result of the metering process, e.g. to indicate whether a packet is IN or OUT. This information might be used in deciding how packets are processed subsequently, whether locally in the device containing the meter or elsewhere in the network, and/or in monitoring or controlling some broader aspect of device or network operation.

A common qualitative metering technique is based on the use of token buckets. Token bucket metering is known in two basic variants: strict conformance and loose conformance. In both cases the meter includes a token counter, or "token bucket", such that the token count $T_C$ corresponds to the number of tokens in the bucket. Each token represents a defined unit of data, such as a bit or byte. Tokens are continually added to the bucket in that the token count is incremented at a defined rate known as the Committed Information Rate (CIR), subject to a specified upper limit on the token count known as the Committed Burst Size (CBS). When a data packet is received by the meter, the packet is categorized as either IN or OUT in dependence on the current token count $T_C$, but the decision process here differs for strict and loose conformance meters. In a strict conformance meter, on arrival of a packet of length L (measured in tokens), if $T_C \geq L$ then the packet is categorized as IN. The token count is then decremented by L tokens, i.e. L tokens are subtracted from the token count. On the other hand, if $T_C < L$, then the packet is categorized as OUT and the token count is not decremented. Thus, with strict conformance, a packet will only be designated IN if there are sufficient tokens in the bucket for a packet of that size. In contrast, in a loose conformance meter, an arriving packet of length L will be categorized as IN if $T_C > 0$. $T_C$ is then decremented by L and may therefore become negative. If $T_C \leq 0$ then the packet is categorized as OUT and the token count is not decremented. Thus, loose conformance meters effectively allow packets to borrow tokens from future token allocations. In particular, if $L_{max}$ is the maximum length of data packets processed by the meter, up to $(L_{max}-1)$ tokens can be borrowed from future allocations.

Both strict and loose conformance token bucket meters have limitations in the presence of multimodal packet length distributions, i.e. where the metered packet stream contains packets having a plurality of different packet lengths. Particular limitations are indicated in the discussion of strict vs. loose conformance token bucket metering in IETF RFC 3290, "An Informal Management Model for Diffserv Routers", Bernet et al., Appendix A, pp. 49 to 54, May 2002. For example, because strict conformance meters only categorize a packet as IN if $T_C \geq L$, the greater the packet length L the less likely it is that a packet will be IN. These meters therefore discriminate against larger packets in a multi-length packet environment, the disadvantage increasing with increasing packet length. With loose conformance meters, since a packet is designated IN if $T_C > 0$, a packet of any length can borrow tokens from future allocations provided there is at least one token in the bucket. This implies greater fairness among packets of different lengths, although smaller packets are prejudiced compared to the strict conformance system. This is because larger packets are more likely to leave the token count negative by borrowing from future allocations. With a negative token count, even a small packet, which might have been accepted in the absence of borrowing, will be categorized as OUT. Another problem is that of jitter. Jitter occurs because incrementing of the token count is capped by the maximum token count CBS. If packet arrival rates are low over a given period then less tokens overall will be added to the bucket since the increments stop when $T_C = CBS$. When packet rates subsequently increase, there may be insufficient tokens to accept all packets when there might have been enough if the packets had arrived at an even rate. Jitter tends to accumulate over multiple hops in a network, and has a particularly negative impact on real-time signals such as voice and video communications where packet loss is most critical. The jitter effect can be particularly pronounced in loose conformance metering of multi-length packet streams due to the borrowing of tokens by larger packets. As explained above, borrowing by large packets tends to prejudice acceptance of smaller packets, thus exacerbating jitter for smaller packets. Jitter is generally more critical for the smaller packets in a multi-length environment since real-time applications typically use small packet sizes.

Certain problems associated with the differentiated treatment of multimodal packet length distributions can be addressed by using separate token buckets for different packet-lengths (see for example "A TCP-Friendly Traffic Marker for IP Differentiated Services", Feroz et al., IWQoS '2000, Pittsburg Pa., June 2000, pp. 35 to 48, section 5.3 (Simulations with per-flow traffic conditioning)). The token buckets can be specified with different CIRs for instance, setting the CIR for smaller packets to a higher value than that for larger packets. However, such an approach requires a large amount of metering state and complicates the configuration of meters.

SUMMARY OF THE INVENTION

A first aspect of the present invention provides a method for metering data packets, having a plurality of different packet lengths, in a device of a data communications network. The method comprises:

incrementing a token count $T_C$ at a token increment rate subject to an upper limit on the token count;

in response to receipt of a packet of length L tokens, determining if both $T_C > 0$ and $T_C + n \geq L$, where n is a defined number of tokens and $0 < n < (L_{max}-1)$ where $L_{max}$ is the maximum length of data packets to be metered;

if so, categorizing the data packet as in profile and subtracting L tokens from the token count; and if not, categorizing the data packet as out of profile.

Embodiments of the invention therefore provide a token bucket metering technique in which the degree of conformance is determined by the parameter n. Two conditions must be satisfied for an arriving packet to be designated IN. Firstly, there must be at least one token in the bucket, and secondly the packet length L must not be greater than $(T_C+n)$. If these conditions are satisfied then the packet is accepted and the token count $T_C$ is decremented by L tokens. The token count can therefore become negative, but only down to $(1-n)$. The parameter n thus sets a "credit limit" of $(1-n)$ tokens which can be borrowed from future token allocations by packets of any length. In methods embodying this aspect of the invention, the value of n is in the range $0<n<(L_{max}-1)$, providing a new type of loose conformance metering with a level of conformance between the strict conformance and loose conformance systems of the prior art. (n=0 corresponds to strict conformance, and $n=(L_{max}-1)$ effectively corresponds to the known loose conformance system since, with this setting, packets of any length can borrow from future token allocations). The degree of conformance, or "looseness level", is determined by the particular value of n in a given embodiment, but the provision of n as a looseness parameter offers significant advantages for multi-length packet metering. By setting the value of n appropriately based on the packet-length distribution and operational requirements of a given system, a balance can be achieved between the strengths and weaknesses of the prior strict and loose conformance systems. The advantages of each system can be exploited, and the disadvantages inhibited, according to the particular conditions and requirements of a given system. The conformance level can thus be tuned to a particular multi-length environment, allowing significantly improved operation compared to prior systems. Moreover, improved metering of multi-length packet streams is achieved in an elegantly simple manner, avoiding the disadvantages associated with use of multiple token bucket meters. Overall therefore, a highly efficient system is provided for metering multi-length packet streams.

Various factors can affect determination of the value of n appropriate for a given system, for example the packet length distribution, nature of the metered traffic, expected traffic patterns, Quality of Service (QoS) requirements, etc. Considerations involved in determining an appropriate value of n for a given system will be discussed in more detail below. In some embodiments, the value of n may be preset for use in a particular environment. Alternatively, n may be set by a network operator via a manual configuration mechanism, and may be updated from time to time if necessary to accommodate changing conditions or requirements.

A second aspect of the present invention provides a method for metering data packets, having a plurality of different packet lengths, in a device of a data communications network, the method comprising:

incrementing a token count $T_C$ at a token increment rate subject to an upper limit on the token count;

in response to receipt of a packet of length L tokens, determining if both $T_C>0$ and $T_C+n \geq L$, where n is a defined number of tokens;

if so, categorizing the data packet as in profile and subtracting L tokens from the token count;

if not, categorizing the data packet as out of profile; and varying n in the range $0 \leq n \leq (L_{max}-1)$, where $L_{max}$ is the maximum length of data packets to be metered, in dependence on at least one feedback signal indicating an operational condition in the network.

This aspect of the invention therefore provides adaptive metering methods in which the degree of conformance is varied in operation, through variation of n, in dependence on feedback indicative of one or more operational conditions in the network. This enables metering processes to adapt to changing network conditions, allowing desired metering characteristics to be achieved according to requirements of a given system. In these methods, n may be varied through values in the range $0 \leq n \leq (L_{max}-1)$. Thus, at certain points in operation of some embodiments, the metering method may implement the strict conformance (n=0) and/or the loose conformance ($n=(L_{max}-1)$) processes of the prior art. However, the conformance level can then be varied as required as network conditions change. Embodiments of this aspect of the invention therefore offer all the benefits associated with the first aspect of the invention discussed above, with the additional advantage of adaptive conformance level control, whereby the degree of conformance can be controlled as desired in accordance with changes in network conditions.

In any given embodiment, the value of n need not be variable across the full extent of the range 0 to $(L_{max}-1)$. In some embodiments, n may be variable through only a subset of values within the aforementioned range. However, embodiments where n can be varied across the full extent of the range (i.e. through a set of values including n=0 and $n=(L_{max}-1)$) offer maximum flexibility in the conformance level. (Of course, n could be allowed to exceed $(L_{max}-1)$ in some cases, but this provides no particular advantage since $n=(L_{max}-1)$ allows borrowing by packets of any length, and thus corresponds to maximum loose conformance).

The variation of n may be based on feedback indicative of a variety of operational conditions in the network. These conditions may be local to the device incorporating the meter, and/or relate to operation of other network elements or even the network as a whole. For example, n may be varied based on feedback indicative of loading in the device containing the meter and/or in network elements remote from the device. This will be discussed in more detail below.

The values of the token increment rate CIR and token count limit CBS are usually fixed in operation, though these could be varied from time to time if appropriate. In general, the adaptive conformance control provided in embodiments of the invention is complementary to other adaptive schemes which might be employed in that it deals specifically with the problems of multimodal packet length distributions.

As mentioned earlier, metering is often combined with marking of data packets. The step of categorizing a data packet may therefore comprise marking the data packet. However, actions other than marking might be performed in conjunction with the metering process. By way of example, packets designated OUT may simply be dropped (discarded) in some embodiments, with packets designated IN being retained and forwarded for further processing. In this case, the categorization steps may simply comprise dropping/retaining packets as appropriate.

It is to be understood that, in general, where features are described herein with reference to methods embodying the invention, corresponding features may be provided in apparatus embodying the invention, and vice versa. Thus, further aspects of the invention provide apparatus for metering data packets, having a plurality of different packet lengths, in a data communications network, the apparatus comprising a token counter for maintaining a token count $T_C$, and control logic. In one aspect the control logic is configured to implement a metering method according to the first aspect of the invention above. In another aspect, the control logic is configured to implement a metering method according to the second aspect of the invention. Other aspects of the invention provide network devices incorporating the aforesaid apparatus, and data communications networks incorporating such devices. Still further aspects of the invention provide computer program products for causing a processor of a network device to perform a metering method according to the first or second aspects of the invention.

BRIEF DESCRIPTION OF THE DRAWINGS

Preferred embodiments of the invention will now be described, by way of illustrative and non-limiting example, with reference to the accompanying drawings in which.

DESCRIPTION OF PREFERRED EMBODIMENTS

Figure 1:
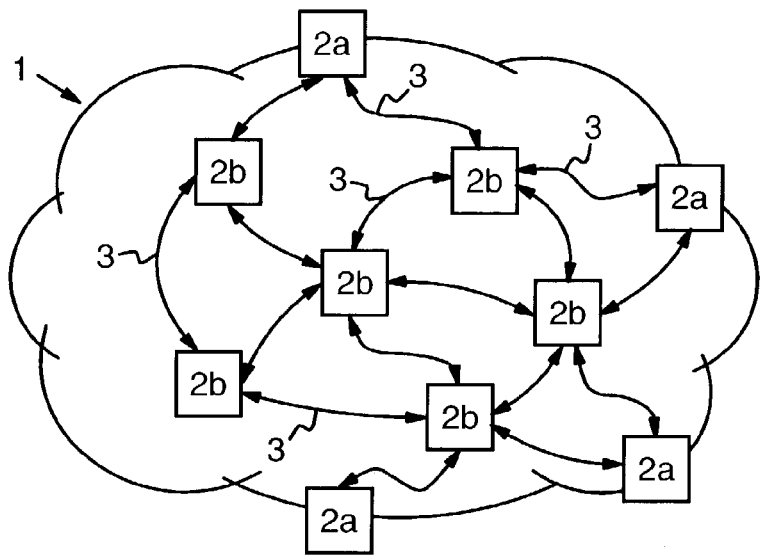
FIG. 1 is a representation of a data communications network.

FIG. 1 shows a simple example of a communications network 1 comprising a plurality of network devices, here routers 2a, 2b, interconnected by links 3. In this example the network 1 represents a subnet of an IETF Differentiated Services (DiffServ) network. The DiffServ architecture is a scaleable approach for providing service differentiation in IP (Internet Protocol) networks. The architecture acknowledges that IP networks are composed of homogeneously administered subnets, or "clouds", and defines mechanisms to apply policy decisions at cloud boundaries. These mechanisms are based on traffic classification, metering, marking and policing at cloud boundaries, and uniform treatment of traffic aggregates inside the cloud. Thus, network 1 will typically form part of a larger network such as the Internet, with the four routers at the edge of the cloud (edge routers 2a) having external links (not shown) to devices outside the cloud. The remaining six routers in FIG. 1 are core routers 2b and have direct links only with other routers in the cloud.

Figure 2:
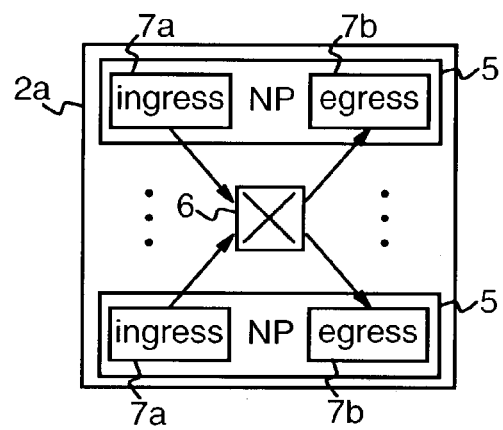
FIG. 2 is a schematic illustration of a router in the FIG. 1 network.

FIG. 2 is a simplified schematic of an edge router 2a of network 1. In this simple representation, router 2a is illustrated as comprising a plurality of network processors (NP) 5 connected to switching fabric 6. Each processor 5 is generally connected to one or more ports (not shown) of the router for connection of links to neighboring devices. Each processor 5 includes ingress logic 7a for processing incoming packets received at an associated port prior to forwarding the packets, where appropriate, across switching fabric 6. Similarly, each processor 5 includes egress logic 7b for processing packets received from switching fabric 6 for transmission over outgoing links via the associated ports. In the following, metering systems embodying the invention will be described, by way of example, in the context of packet metering in the ingress logic of processors in edge routers 2a. In particular, as part of the traffic control mechanisms in DiffServ cloud 1, the ingress logic 7a of processors in edge routers 2a meters streams of data packets which are to be transmitted on into the cloud. Since traffic in such networks may be generated by a variety of different applications and conform to various different protocols, traffic streams metered in ingress logic 7a generally include packets with a variety of different packet lengths. One embodiment of a metering system which may be employed in this scenario will now be described with reference to FIGS. 3 to 5.

Figure 3:
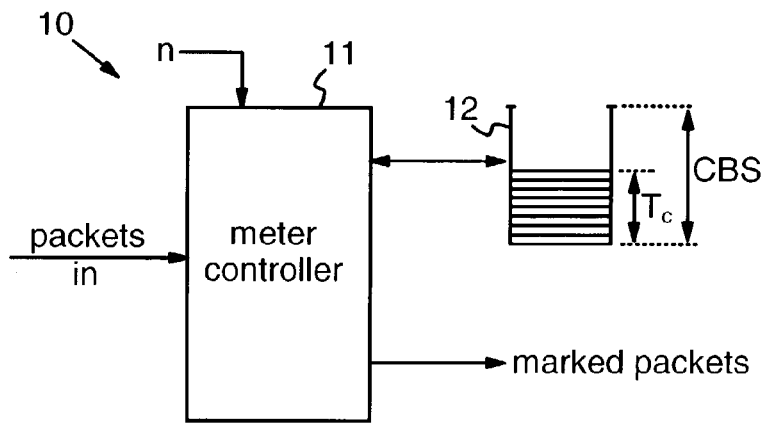
FIG. 3 is a schematic illustration of metering apparatus embodying the invention.

Referring first to FIG. 3, the metering apparatus 10 comprises a meter controller 11 which receives data packets in the packet stream to be metered, and a token counter 12 which is controlled by meter controller 11. In this embodiment, metered packets categorized as IN or OUT are marked accordingly by controller 11, and the marked packets are then output, for example to a queue awaiting the next stage of processing. The functionality of meter controller 11 is described in detail below, and it will be understood from this description that controller 11 and token counter 12 can be implemented by suitably configured control logic. In general, such control logic may comprise hardware or software or a combination thereof. As in the present example, the control logic is conveniently implemented by a processor running software which configures the processor to perform the functions described. Suitable software will be apparent to those skilled in the art from the description herein. (Of course, while such a processor may be preconfigured with appropriate software, the program code constituting such software could be supplied separately for loading in the network device to configure the processor to operate as described. Such program code could be supplied as an independent element or as an element of the program code for a number of control functions, and may be supplied embodied in a computer-readable medium such as a diskette or an electronic transmission sent to a network operator).

Figure 4:
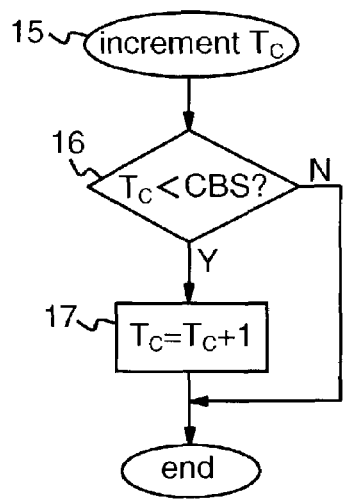
FIGS. 4 and 5 are flow charts illustrating operation of the apparatus of FIG. 3.

Under control of meter controller 11, token counter 12 maintains a token count $T_C$ indicating the number of tokens available at any given time. The token count $T_C$ is initially set to a preset maximum token count CBS, and is decremented as packets are metered as discussed further below. The token count is also incremented by controller 11 at a preset rate CIR (tokens/s). This process is illustrated in FIG. 4. The increment process begins at step 15 when triggered by a timer event which occurs every t=1/CIR seconds. In step 16, controller 11 then checks whether the current token count $T_C$ is less than the maximum token count CBS. If not, i.e. if $T_C$=CBS, then the token count is not incremented and the process terminates. Assuming $T_C$<CBS, however, then the token count is incremented by one token in step 17. The process is then complete until the next timer event. Thus, the token count $T_C$ is incremented by up to CIR tokens each second, subject to the upper limit CBS on the token count. The particular values of CBS and CIR may be set by an operator for the meter, for example via a management information base from which various aspects of network operation can be monitored and controlled by a network operator. Suitable values for these parameters in a given system will be apparent to those skilled in the art.

Figure 5:
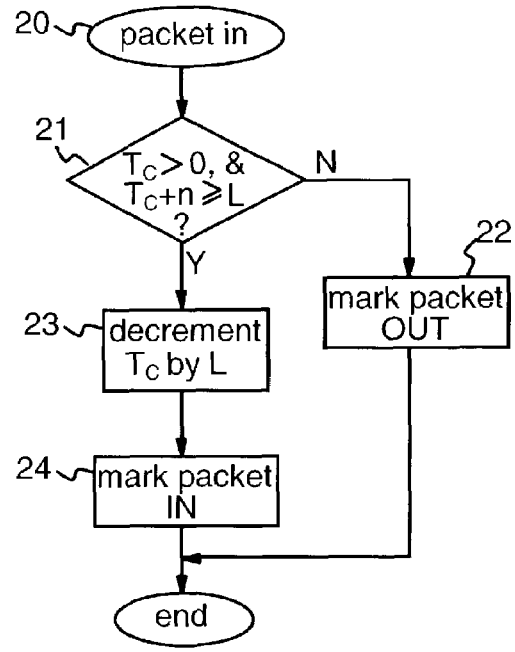

In the metering process implemented by meter 10, the degree of conformance is determined by the value of a looseness parameter n. In this example, the value of n is set by operator input to meter controller 11 as indicated in FIG. 3, for example via the aforementioned management information base. In the present embodiment, n is set to a value in the range $0<n<(L_{max}-1)$, where $L_{max}$ is the maximum length of data packets in the packet stream metered by meter 10. (Typically, $L_{max}$ will be equal to the MTU (Maximum Transmissible Unit) for the network, though $L_{max}$ may be less than this value if the packet stream to be metered contains only a subset of the overall range of network traffic). FIG. 5 illustrates the operation of meter 10 on arrival of a data packet to be metered. On receipt of the packet as indicated at step 20, controller 11 then determines in decision block 21 whether two conditions are satisfied. The first condition is that $T_C>0$, i.e. there is at least one token in the bucket. The second condition is that the length L of the received packet, measured in tokens, is no greater than $(T_C+n)$. If either condition is not satisfied in step 21 then operation proceeds to step 22. Here controller 11 marks the packet as OUT, whereupon the packet is output to the next stage of processing and the process is complete. Assuming, however, that both conditions are satisfied in step 21, controller 11 then decrements the token count by L tokens in step 23 (i.e. $T_C:=T_C-L$) and marks the packet as IN in step 24. The packet is then output for further processing and the process is complete.

The effect of the looseness parameter n in the above system is to set the level of conformance somewhere between the strict and loose conformance systems of the prior art. The particular conformance level is determined by the value of n employed and its relationship to the range of packet lengths in the metered packet stream. The effect of the value of n is illustrated by the graphs of FIGS. 6a to 6e and 7a to 7e. FIGS. 6a to 6e show the results of a simulation using the above system in a multi-length packet environment with 45 UDP/CBR (User Datagram Protocol/Constant Bit Rate) sources with random noise and packet lengths of 64, 512 and 1500 bytes. One token represents one byte, CIR was set to 10 Mbits/s, and CBS was set to 10*MTU (i.e. $10*L_{max}=15000$ bytes). Successive figures show the metered rates for each packet length with n=0, 100, 200, 500 and 1000 bytes respectively. These figures demonstrate that, with strict conformance (n=0), smaller packets have a better chance of being metered IN than larger packets. The advantage for smaller packets gradually reduces as n is increased towards MTU, and fairness between packets of different lengths is progressively enhanced. (Fairness here means that, regardless of encapsulating packet length, a given amount of information within a packet is equally likely to be IN). FIGS. 7a to 7e show the corresponding set of results for an equivalent simulation using 116 TCP/FTP (Transport Control Protocol/File Transfer Protocol) sources. It can be seen that the same trends are demonstrated by these results in spite of the quite different nature of the UDP and TCP protocols. The basic metering process is not sensitive to specific packet lengths per se in that the process correctly meters uni-length traffic of any packet length, regardless of the value of n. However, by selecting the value of n in a multi-length traffic environment, the conformance level, or degree of looseness, can be selected to give optimal performance according to the requirements of a given system.

As will be apparent to those skilled in the art, various factors can be considered in determining the particular value of n appropriate for a given system. Such factors include: the particular packet length distribution to be metered; the nature of the metered traffic, e.g. whether some packets, such as those for real time applications, are more critical than others; expected traffic patterns, e.g. whether more packets of some sizes than of others are expected; desired performance characteristics, e.g. meeting of QoS specifications such as guaranteed rates, etc. Consideration of such factors enables the value of n to be set to give the optimal conformance level for a given system, balancing the advantages of strict and loose conformance as appropriate. This allows significantly improved operation compared to prior systems. The use of n as a bound on looseness improves upon strict conformance by providing a means to control the preferential metering of smaller packets to a desired level. In addition, compared to the prior loose conformance system, the use of n enables a desired degree of fairness among various packet sizes to be achieved with reduced loss of valuable small packets. Moreover, control of the looseness offers the possibility to achieve work-conserving scheduling as well as to balance the tradeoff between work-conserving and jitter minimization, because the jitter impact of borrowing by larger packets, discussed earlier, can be inhibited. (In order to achieve differentiated services and QoS requirements in packet-based networks, appropriate scheduling algorithms have to be provided. Work-conserving scheduling algorithms make use of excess bandwidth (i.e. bandwidth that is not required to fulfill the minimum rate guarantees of the queues of a forwarding device). Thus, work-conserving algorithms maximize utilization of physical bandwidth and are therefore favored by network operators. However, jitter can only be minimized with complex (and thus computationally expensive) non-work-conserving scheduling algorithms. Hence, jitter reduction and bandwidth utilization are conflicting requirements with conventional scheduling algorithms. Provision of the looseness parameter n in embodiments of the present invention helps to reduce jitter for smaller packets (to which jitter is typically more important) while still using a work-conserving scheduling discipline).

Figure 8:
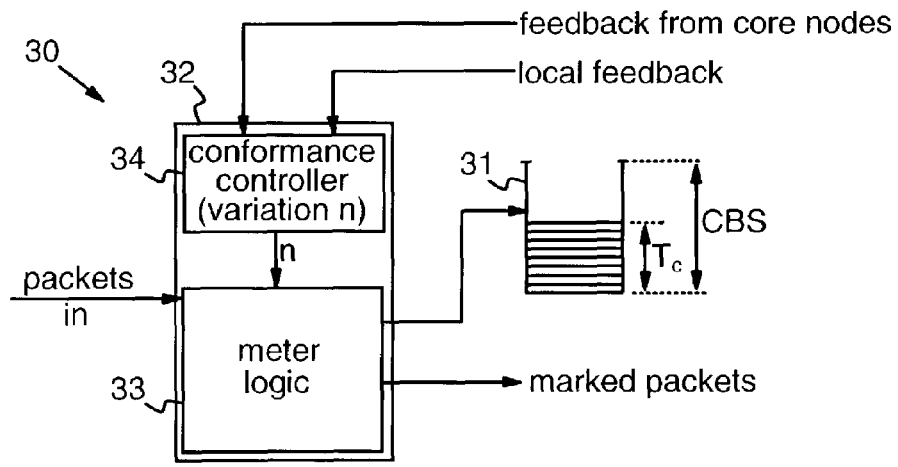
FIG. 8 is a schematic illustration of metering apparatus according to a second embodiment of the invention.
Figure 6A:
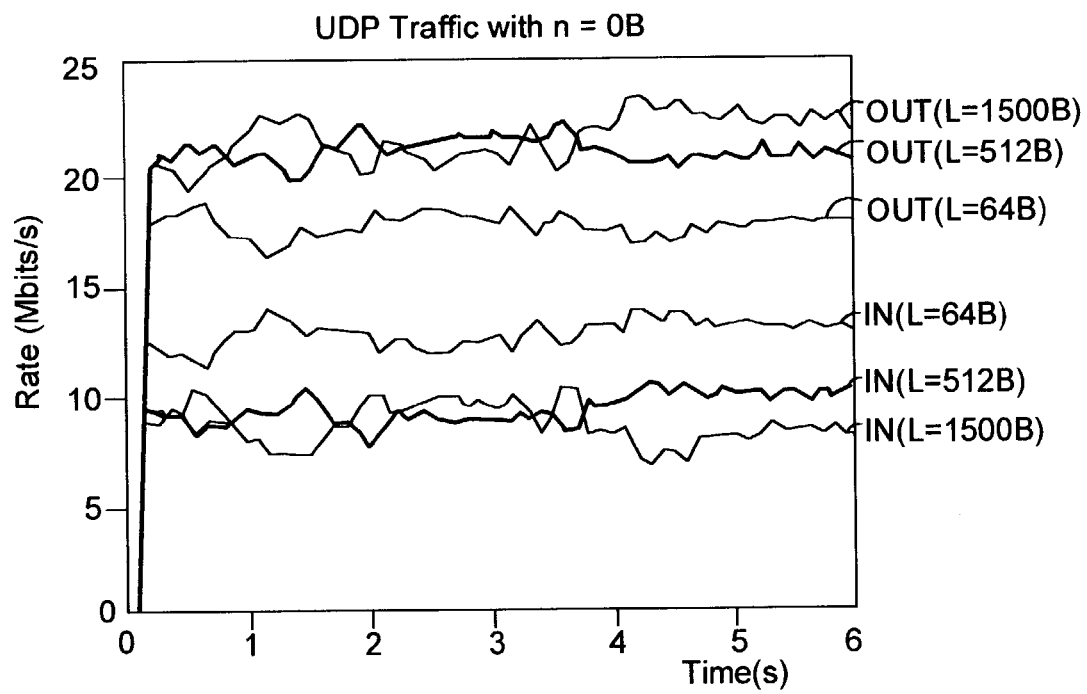
FIGS. 6a through 6e are graphs illustrating the effect of varying the conformance level in a multi-length packet environment with a first network protocol.
Figure 6B:
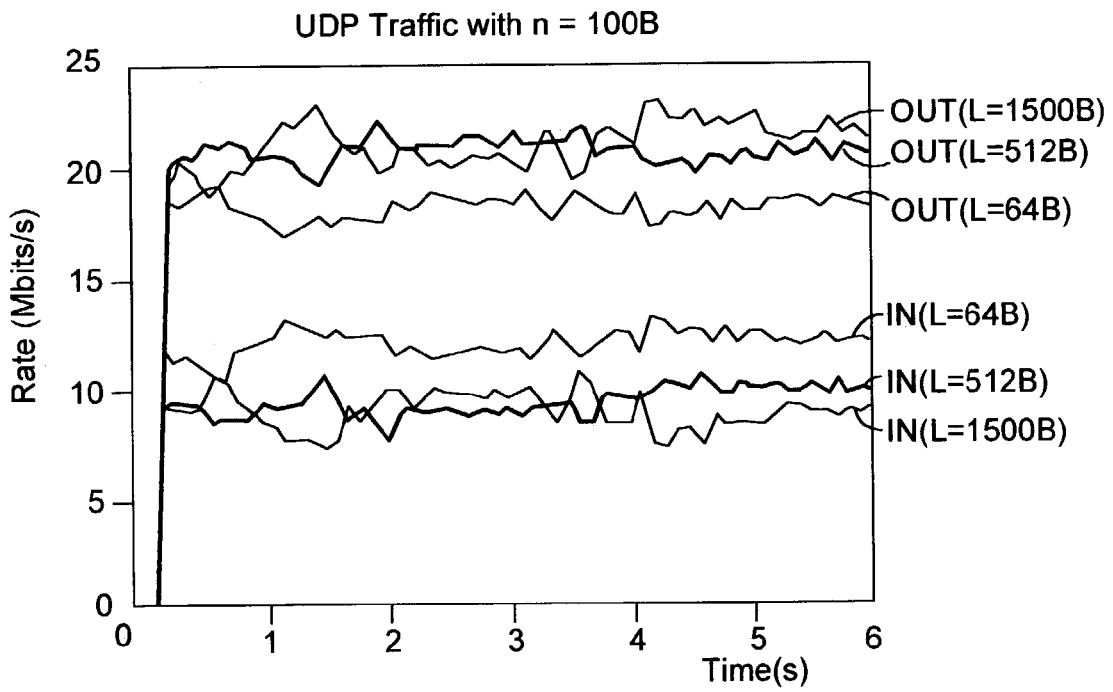
Figure 6C:
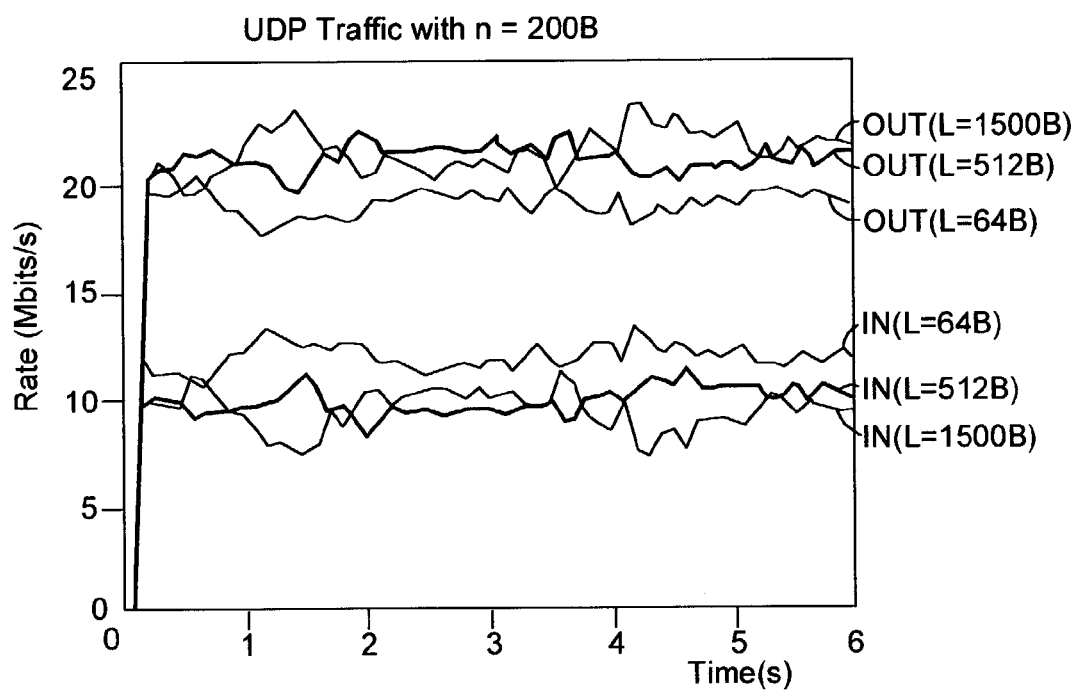
Figure 6D:
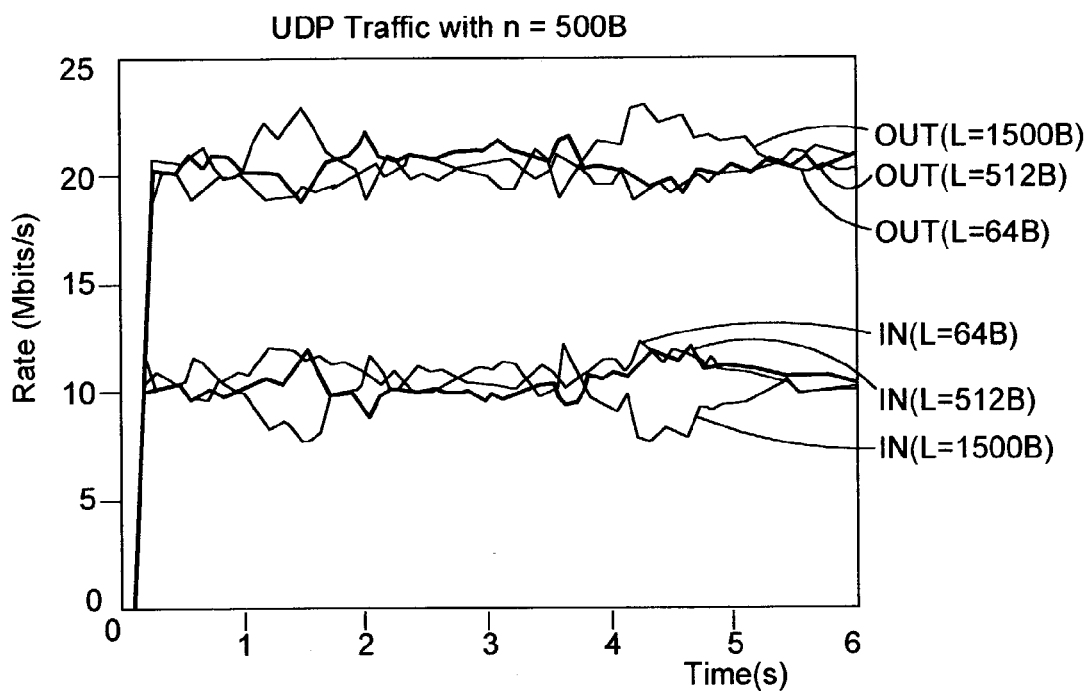
Figure 6E:
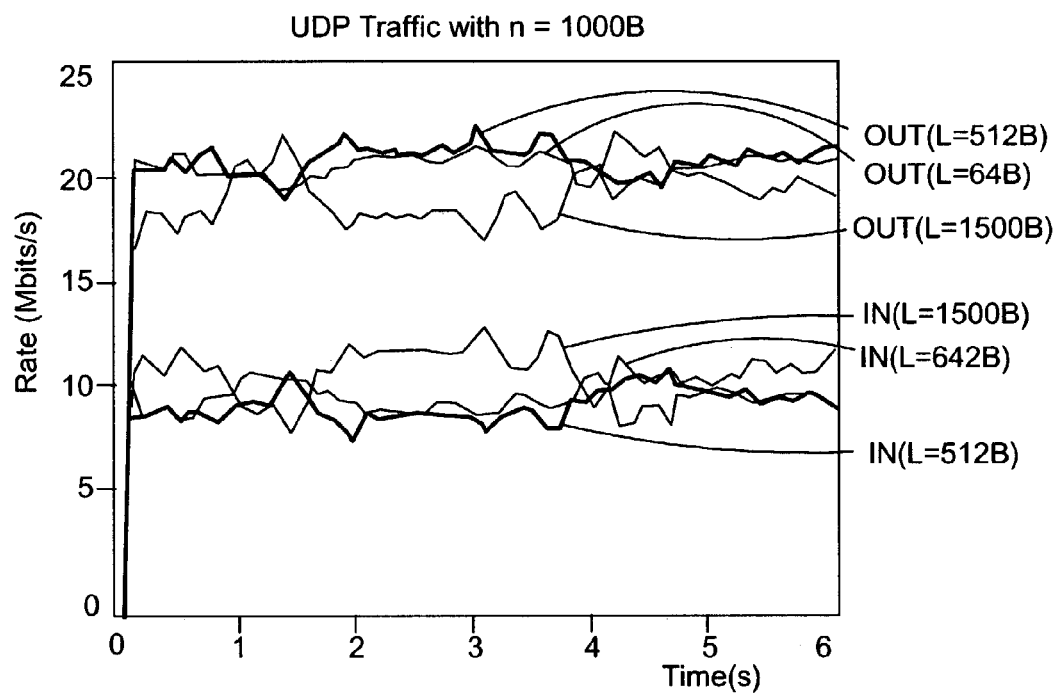
Figure 7A:
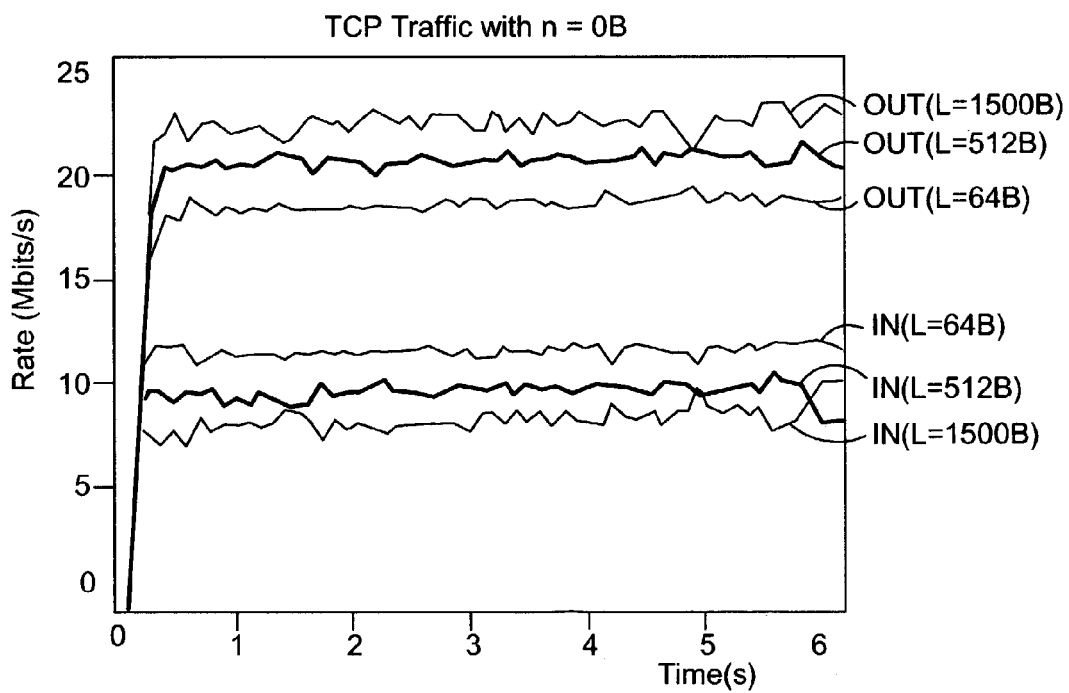
FIGS. 7a through 7e give a corresponding set of graphs for a second network protocol.
Figure 7B:
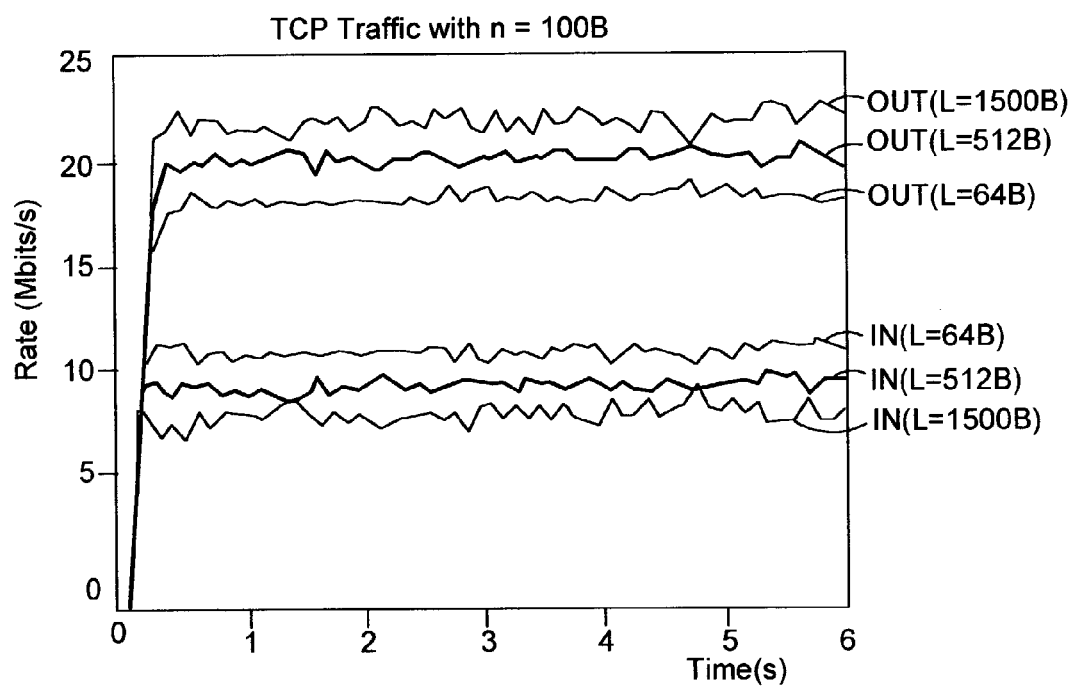
Figure 7C:
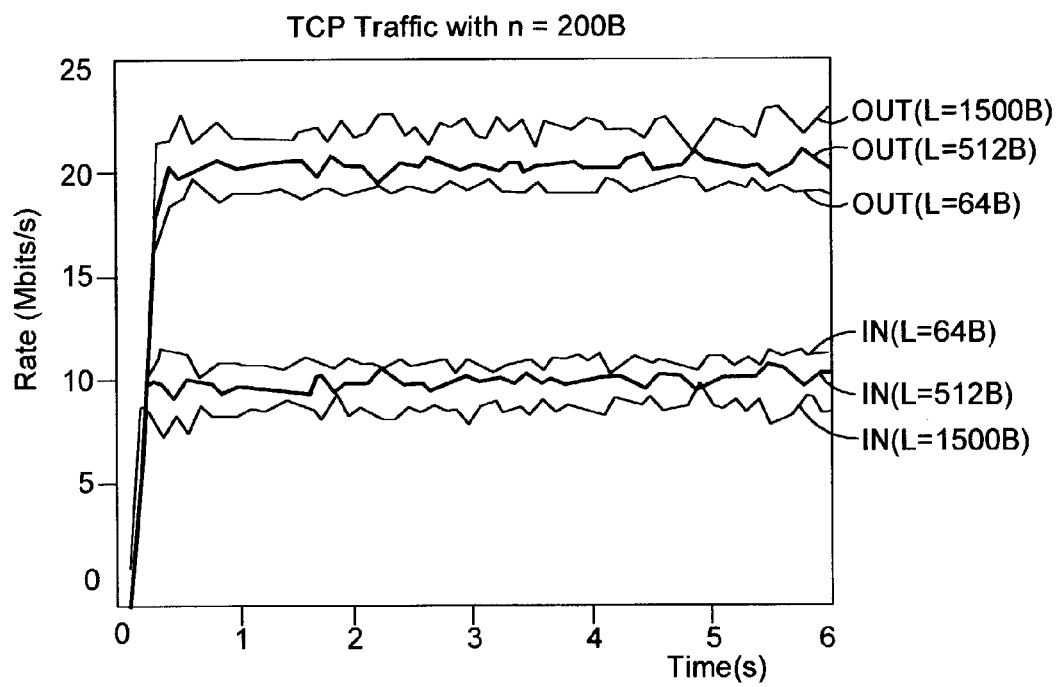
Figure 7D:
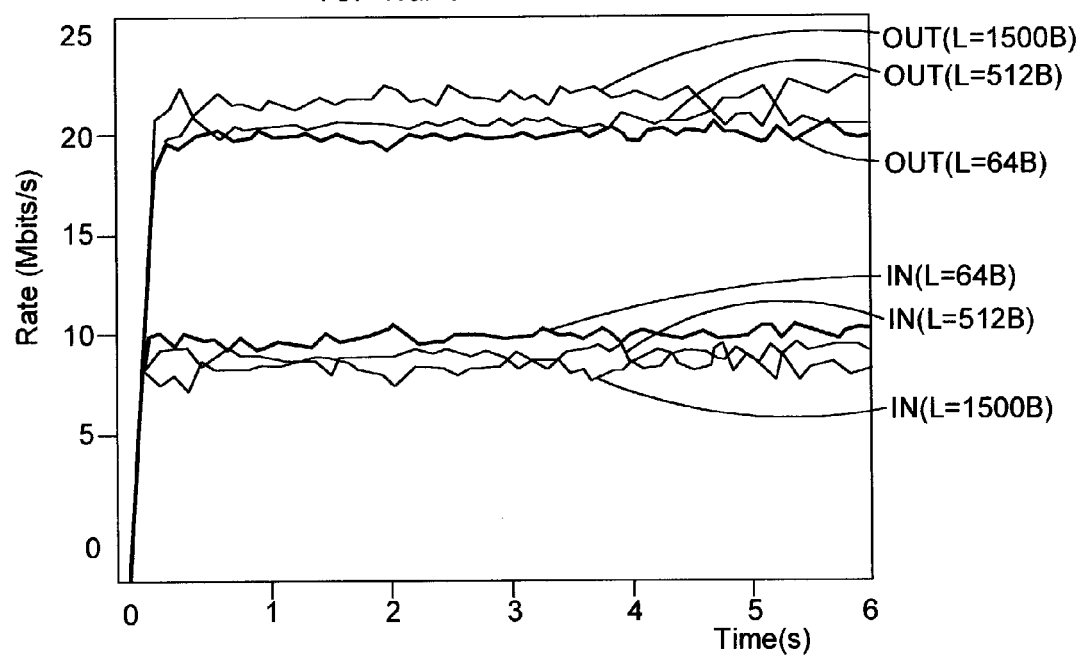
Figure 7E:
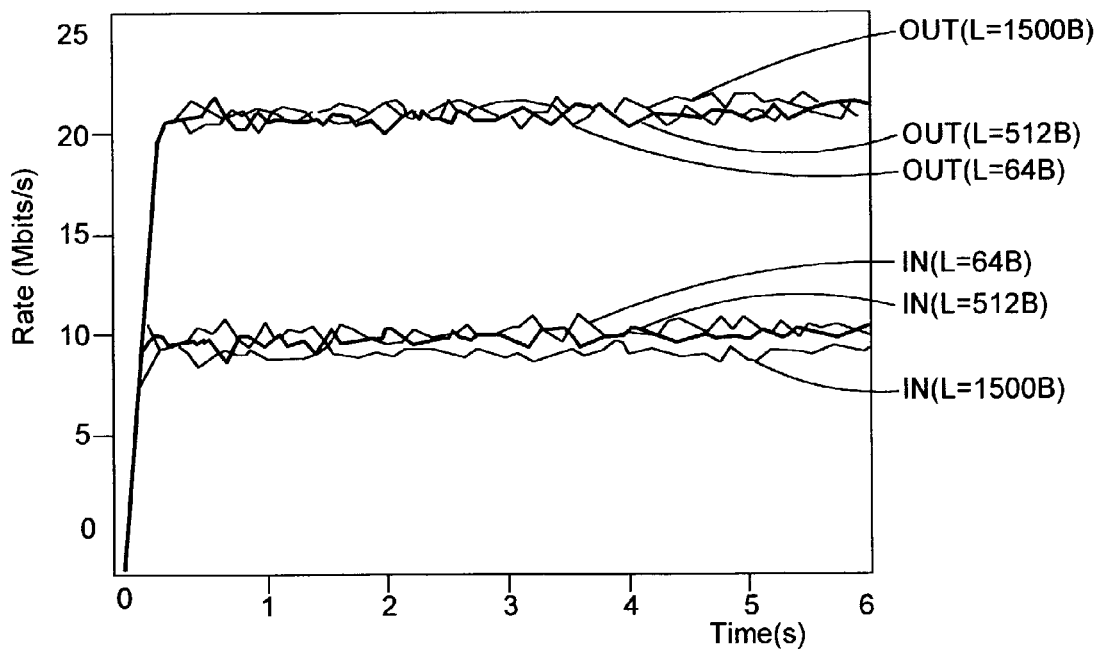

FIG. 8 shows a second embodiment of a meter according to the invention. As with the embodiment already described, the meter 30 of FIG. 8 may be employed for marking packets in the ingress logic 7a of edge routers 2a in a DiffServ network 1, and the operation of meter 30 will be described by way of example in this context. Meter 30 corresponds generally to meter 10 described above, having a token counter 31 controlled by a meter controller 32. In this embodiment, however, meter controller 32 comprises meter logic 33 and a conformance controller 34. Meter logic 33 performs all the functions of meter controller 11 described above, but in this case the value of n to be used in the metering process is supplied by conformance controller 34. Operation commences with n at a particular value which may be preset by an operator based on factors discussed earlier. Subsequently, conformance controller 34 periodically calculates a value for n in the range $0 \le n \le (L_{max}-1)$ based on feedback indicative of operational conditions in network 1. In this embodiment, conformance controller 34 receives a local feedback signal indicative of loading in the edge router 2a containing the meter 30. Controller 34 also receives a remote feedback signal indicative of loading in the core of network 1. (Though represented by a single arrow in the figure, in practice the remote feedback signal may comprise individual feedback from respective core nodes 2b. Moreover, the term "signal" is used herein in the broadest sense. For example, a signal may simply be a discrete value or set of values indicative of an operational condition, which may be periodically transmitted to or accessed by controller 34 in operation).

In the present example, the value of n is set periodically as a mathematical function of a moving average of the utilization of the data links over which the metered traffic is sent. The local feedback signal here indicates utilization of the set of outgoing links of edge router 2a over which the metered packets are to be transmitted. Utilization of a given link can be assessed in any convenient manner, for example by dedicated meters monitoring transmission rates, or simply by monitoring queue lengths in output buffers. However bandwidth utilization is measured, the local feedback signal in this embodiment comprises a value indicative of utilization of each link in the aforementioned set. In this example, conformance controller 34 periodically receives and averages these values to obtain a local loading parameter indicative of current loading in edge router 2a. Similarly, the remote feedback signal in this embodiment comprises a set of values sent periodically by core routers 2b which indicate utilization of each link in the core of network 1. These values are also averaged by controller 34 to obtain a remote loading parameter indicative of current loading in the network core. Conformance controller 34 then calculates a current value for n as a specified function of the local and remote loading parameter values. The function employed here serves to vary the value of n in a desired manner in dependence on the local and remote loading levels. The specific function utilized will depend on various factors as discussed above, and can be designed to vary n so as to adapt the conformance level as desired with changing load conditions. By way of example, upper and lower thresholds may be set for each of the local and remote loading levels. On periodic calculation of the local and remote loading parameters, if either parameter exceeds its upper threshold, indicating excessive loading, then the value of n may be stepped down by a predetermined amount, subject to a lower limit of n=0. Similarly, if either parameter is less than its lower threshold, indicating low loading, while the other parameter is below its upper threshold, then the value of n may be stepped up by a predetermined amount, subject to an upper limit of $n=(L_{max}-1)$. In this way, n will be progressively reduced, providing increasingly strict conformance, in the presence of excessive loading. This provides an increasing bias in favor of smaller packets, protecting valuable small packets in heavy load conditions. (As explained earlier, the loss of a percent or so of small packets such as voice packets may be economically more costly than the loss of a few large data packets that can, and probably will be, retransmitted). However, when loading levels subsequently reduce, n will be stepped up again to reduce the prejudice against larger packets and enhance fairness among different packet sizes.

The above description gives one particular example of how n might be varied with changing operational conditions. As will be apparent to those skilled in the art, however, the basic principle of adaptive conformance level control by varying n in dependence on network conditions can be implemented in numerous ways to achieve desired adaptive metering characteristics. Feedback indicative of various operational conditions might be used to control the conformance level. As another example, the packet delay variation for one or more packet streams to which the metered packets belong could be measured periodically in network 1 and transmitted as feedback to edge router 2a. (Measurement of the packet delay variation is discussed in "IP Packet Delay Variation Metric for IP Performance Metrics (IPPM)", Demichelis et al, IETF RFC 3393, November 2002). The looseness parameter n can then be varied as a function of the measured value(s), for example to increase the looseness level when measured values are excessive, and reduce the looseness level when measured values are low. Alternatively, the feedback control might be based on monitoring of various other operational conditions. As well as those mentioned above, further possibilities include: events local to the network device such as utilization threshold excess, failure events, etc.; external events such as utilization threshold excess, failure events, etc. from other network devices; external events from a network management system; time events, e.g. time of day, day of week, etc.; and decision events from a central policy decision point based on a rule set. In any given system, the particular parameters used for feedback can be chosen as desired according to locally applicable operational requirements.

It will be seen from the above that embodiments of the invention provide an elegantly simple mechanism for controlling the conformance of a token bucket meter in a flexible way, allowing the metering process to be tuned for multi-length packet distributions. Many changes and modifications can of course be made to the specific examples described above. For example, in general in adaptive embodiments, the value of n may be controlled in dependence on one or more feedback signals indicative of one or both of local and remote operational conditions. As in the above example, a particular feedback signal may comprise one or more parameter values transmitted to or accessed by the meter in operation. Alternatively, for example, the feedback signal may be some function of such parameter value(s) provided to or derived by the meter. In addition, while the value of n may be assessed periodically to determine if adjustment is required, in other embodiments n may only be adjusted in response to feedback indicating a relevant change in the operating condition(s). Further, while the above embodiments have been described in the particular context of metering at ingress points of edge routers in a DiffServ network, the invention can be applied in numerous other network scenarios. A given network device may employ a plurality of meters for different traffic streams and/or at different stages of the packet handling process. Meters embodying the invention may be provided in various network devices, including routers, switches, gateways (e.g. virtual private network gateways and network address translation gateways), intrusion detection sensors, firewall systems, modems, load balancers and protocol offload devices. In general, one or more meters embodying the invention may be employed in one or more devices of a given network as required. In some embodiments, rather than marking data packets, the meter may simply drop packets categorized as OUT. Many other changes and variations can be made to the foregoing embodiments within the spirit and scope of the present invention.

We claim:

1. A method for metering data packets, having a plurality of different packet lengths, in a device of a data communications network, the method comprising:
   incrementing a token count $T_c$ at a token increment rate subject to an upper limit on the token count;
   in response to receipt of a packet of length L tokens, determining if both $T_c>0$ and $T_c+n \geq L$, where n is a defined number of tokens;
   if so, marking the data packet as in profile and subtracting L tokens from the token count;
   if not, marking the data packet as out of profile; and
   varying n in the range $0 \leq n \leq (L_{max}-1)$, where $L_{max}$ is the maximum length of data packets to be metered, in dependence on at least one feedback signal indicating an operational condition in the network.

2. A method according to claim 1 including varying n across the full extent of said range.

3. A method according to claim 1 including varying n in dependence on a feedback signal indicating loading in said device.

4. A method according to claim 3 wherein said feedback signal is indicative of utilization of a set of outgoing data links of said device over which said data packets are transmitted by the device.

5. A method according to claim 1 including varying n in dependence on a feedback signal indicating loading in one or more network elements remote from said device.

6. A method according to claim 5 wherein said feedback signal is indicative of utilization of a set of data links in the network over which said data packets are transmitted.

7. A method according to claim 1 including varying n in dependence on a feedback signal indicative of the packet delay variation for at least one packet stream to which said data packets belong.

8. Apparatus for metering data packets, having a plurality of different packet lengths, in a data communications network, the apparatus comprising:
   a token counter for maintaining a token count $T_c$; and
   control logic configured to increment the token count $T_c$ at a token increment rate subject to an upper limit on the token count in response to receipt of a packet of length L tokens, to determine if both $T_c>0$ and $T_c+n \geq L$ where n is a defined number of tokens and to vary n in the range $0 \leq n \leq (L_{max}-1)$, where $L_{max}$ is the maximum length of data packets to be metered, in dependence on at least one feedback signal indicating an operational condition in the network.

9. A network device for processing data packets in a data communications network, the device having at least one meter for metering data packets processed by the device, said meter comprising a token counter for maintaining a token count $T_c$; and control logic configured:
   to increment the token count $T_c$ at a token increment rate subject to an upper limit on the token count;
   in response to receipt of a packet of length L tokens, to determine if both $T_c>0$ and $T_c+n \geq L$, where n is a defined number of tokens;
   if so, to categorize the data packet as in profile and subtract L tokens from the token count;
   if not, to categorize the data packet as out of profile; and
   to vary n in the range $0 \leq n \leq (L_{max}-1)$, where $L_{max}$ is the maximum length of data packets to be metered, in dependence on at least one feedback signal indicating an operational condition in the network.

10. A data communications network comprising a plurality of network devices including at least one network device according to claim 9.

11. A computer program product comprising a computer readable medium having embodied therein computer readable program code means for causing a processor of a network device to perform a method for metering data packets having a plurality of different packet lengths, the method comprising:
   incrementing a token count $T_c$ at a token increment rate subject to an upper limit on the token count;
   in response to receipt of a packet of length L tokens, determining if both $T_c>0$ and $T_c+n \geq L$, where n is a defined number of tokens;
   if so, categorizing the data packet as in profile and subtracting L tokens from the token count;
   if not, categorizing the data packet as out of profile; and
   varying n in the range $0 \leq n \leq (L_{max}-1)$, where $L_{max}$ is the maximum length of data packets to be metered, in dependence on at least one feedback signal indicating an operational condition in the network.

12. The apparatus of claim 8 further including if both conditions are met, to categorize the data packet as in profile and subtract L tokens from the token count; and
   if not, to categorize the data packet as out of profile.

* * * * *